April 3, 1934.   E. A. STALKER   1,953,444
FLUID ROTOR
Filed July 23, 1932   8 Sheets-Sheet 1
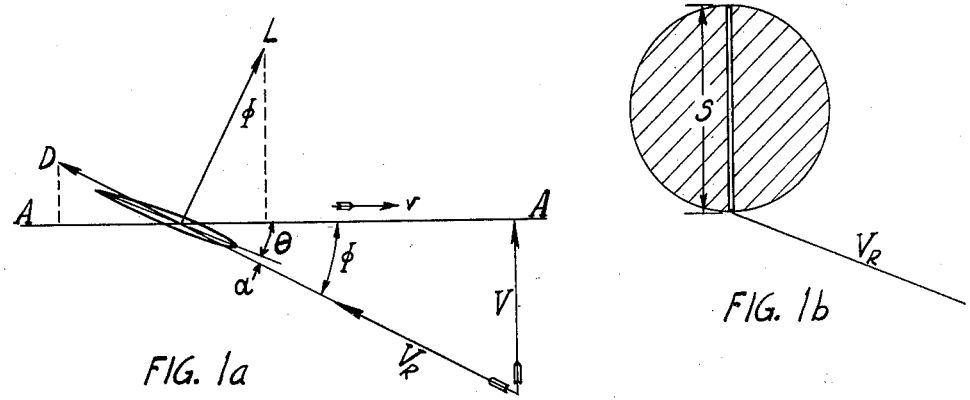
FIG. 1a
FIG. 1b
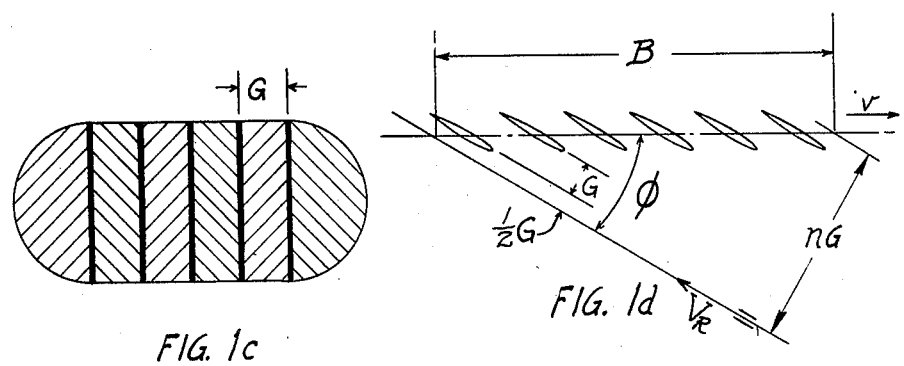
FIG. 1c
FIG. 1d
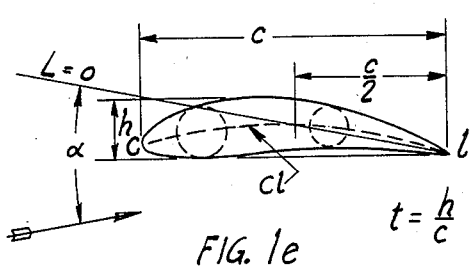
FIG. 1e
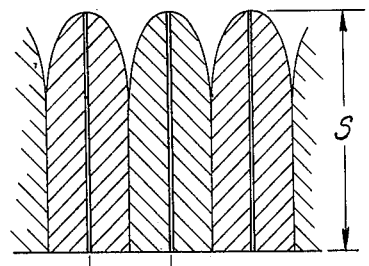
FIG. 1f
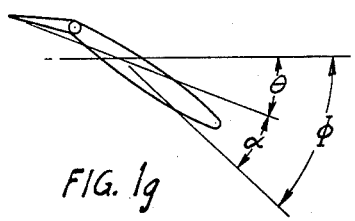
FIG. 1g
INVENTOR
Edward A. Stalker INVENTOR
Edward A. Stalker

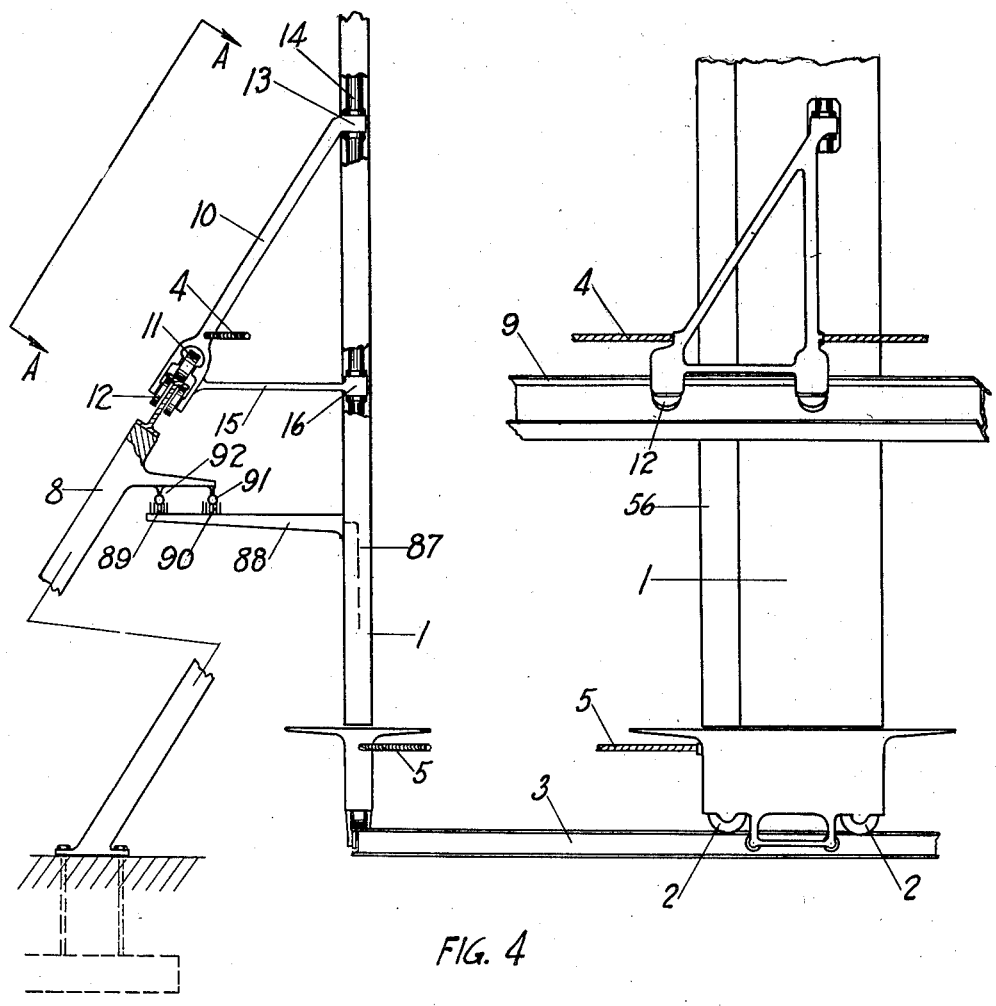
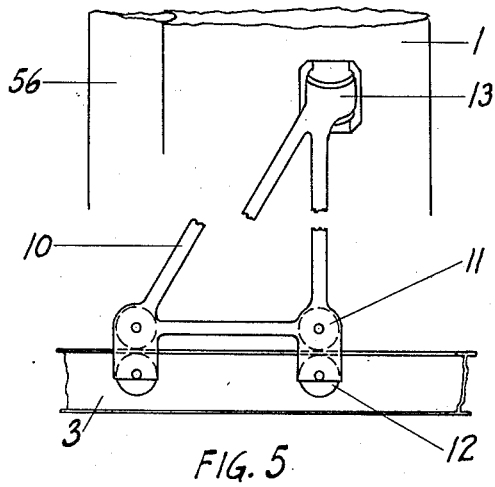
FIG. 4
FIG. 5

April 3, 1934.  E. A. STALKER  1,953,444
FLUID ROTOR
Filed July 23, 1932  8 Sheets-Sheet 4

INVENTOR
Edward A. Stalker

April 3, 1934.   E. A. STALKER   1,953,444
FLUID ROTOR
Filed July 23, 1932   8 Sheets-Sheet 5

INVENTOR
Edward A. Stalker

April 3, 1934.　　　　E. A. STALKER　　　　1,953,444
FLUID ROTOR
Filed July 23, 1932　　　8 Sheets-Sheet 6

(SECTION 10-10 FIG.8

INVENTOR
Edward A. Stalker

April 3, 1934.  E. A. STALKER  1,953,444
FLUID ROTOR
Filed July 23, 1932   8 Sheets-Sheet 8

SECTION 17-17

INVENTOR
Edward A. Stalker

Patented Apr. 3, 1934

1,953,444

UNITED STATES PATENT OFFICE 1,953,444

FLUID ROTOR

Edward A. Stalker, Ann Arbor, Mich.

Application July 23, 1932, Serial No. 624,341

20 Claims. (Cl. 170—25)

My invention relates to improvements in aero-electric power plants in which the elements experiencing a cross-wind force move substantially parallel to themselves; and the objects of my improvements are, first to provide an arrangement of elements capable of extracting the maximum amount of energy from the wind; second, to provide a structural design that is economical and efficient; third, to provide elements of sufficiently low cost that they may be combined economically to form a plant of the proportions dictated by the theory here developed; and, as shown by the theory, necessary to extract the maximum energy from the wind.

I attain these objects by the devices illustrated in the accompanying drawings in which—

Figure 2:
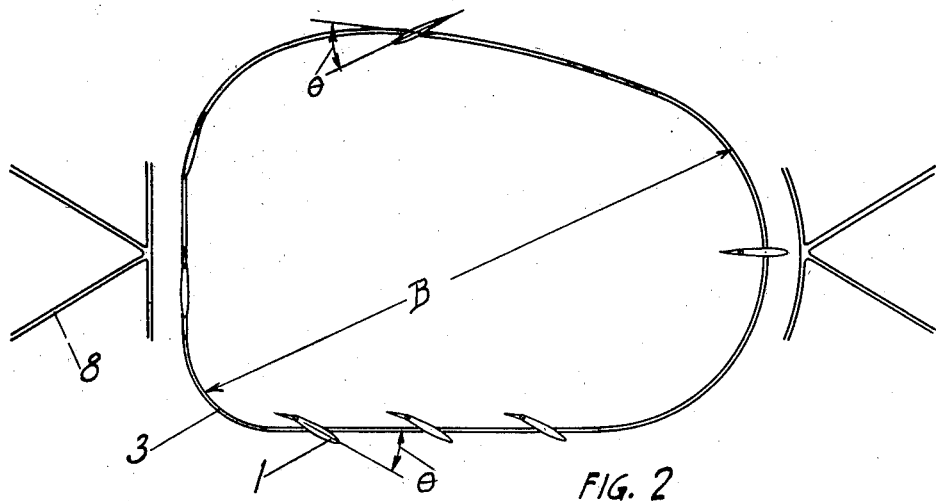
Figure 3:
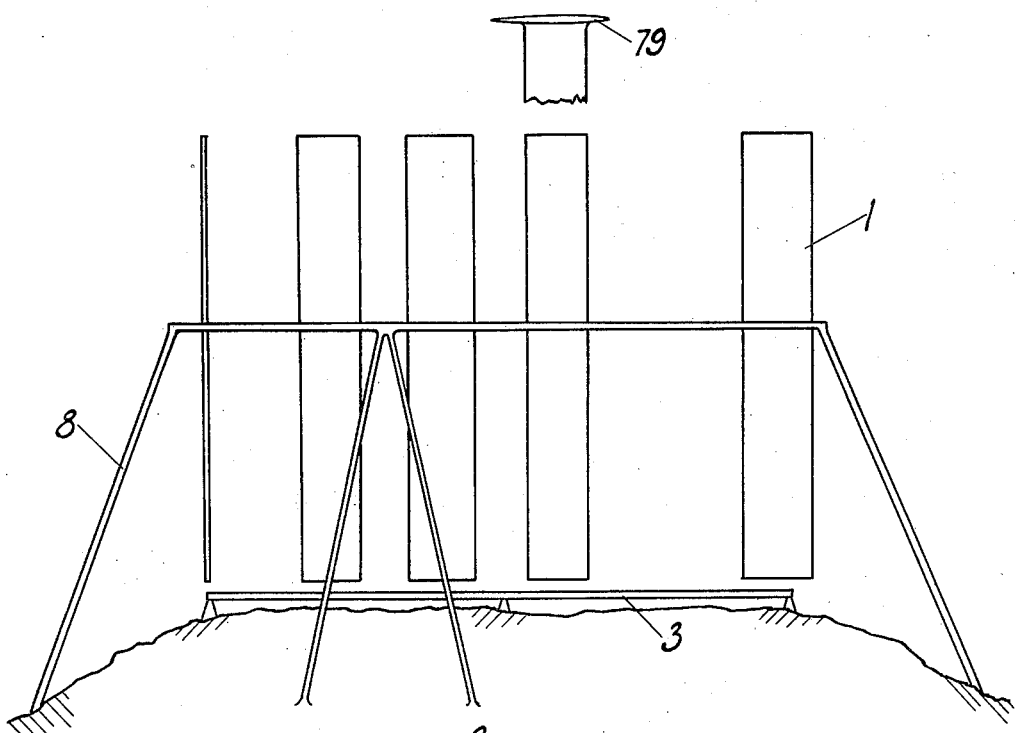
Figure 6:
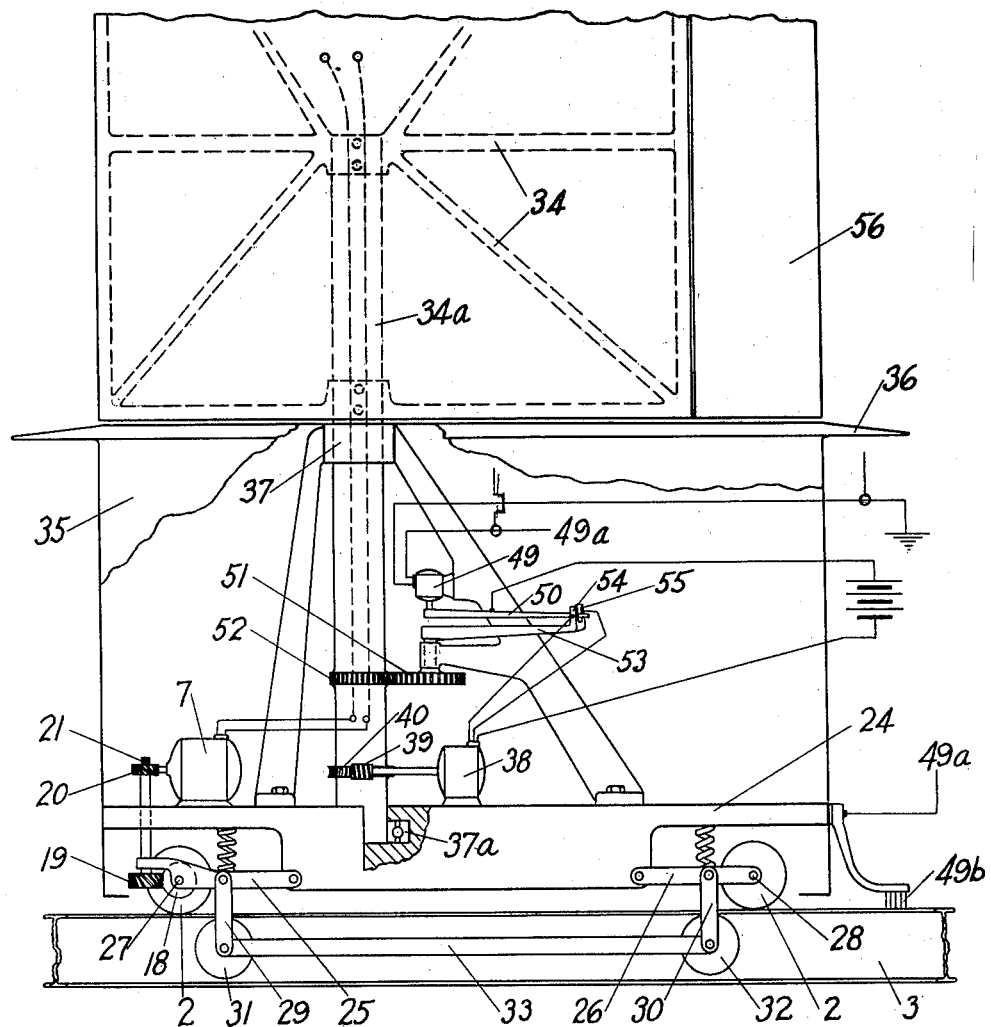
Figure 7:
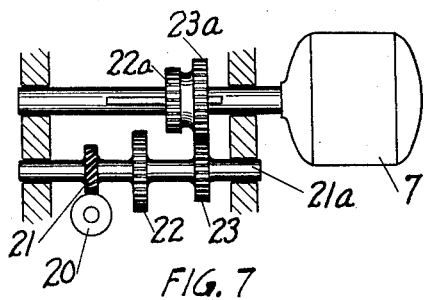
Figure 12:
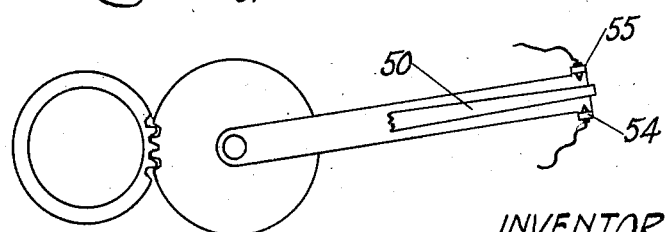
Figure 14:
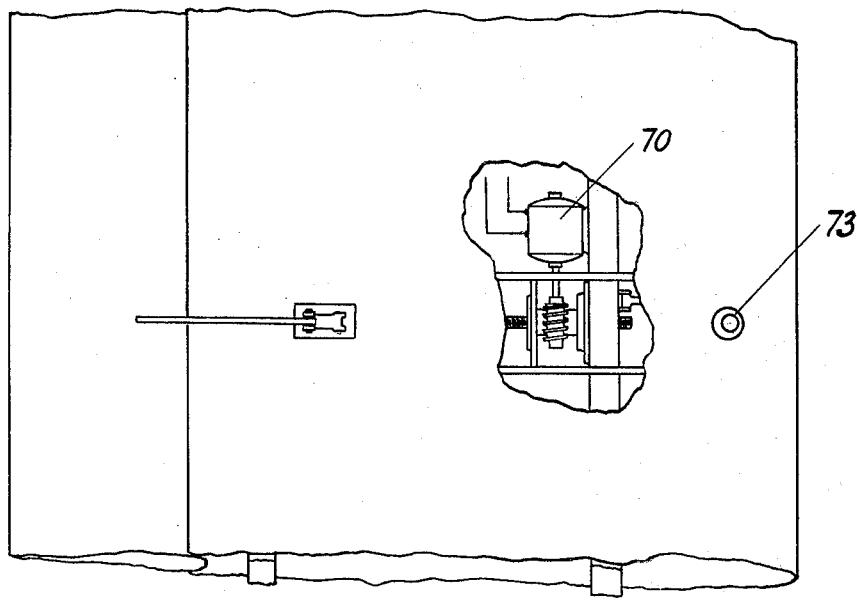
Figure 13:
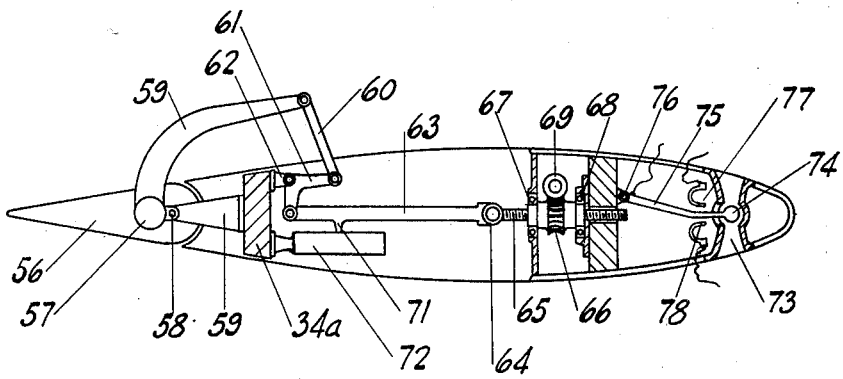
Figures 15, 16:
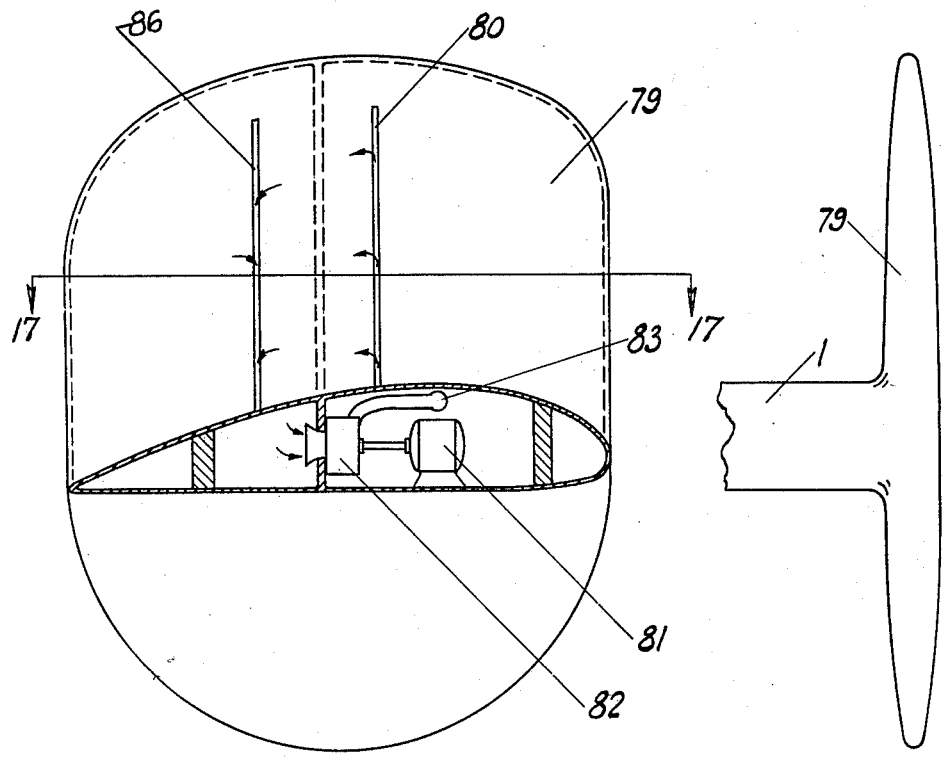
Figure 17:
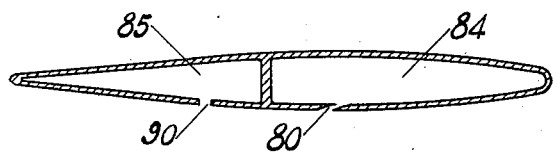

Figures 1a to 1f are diagrams related to the theory. Figure 2 shows a plan view of a power plant while Figure 3 shows the elevation. Figures 4 and 5 depict in more detail the design of the wings and their supporting structure; Figures 6 and 7 show the means of driving the electric generator through the axle mechanism and the method of housing the generator in the wing; Figures 8, 9, 10, and 11 illustrate the method of rotating the wing to the correct angle, dependent on the direction of the wind. Figures 12 and 13 show the means to operate the wing flap. Figure 14 is a plan of the wing with parts removed to show the motor and worm tip while Figure 15 is a front view of the wing tip and end disk. Figure 16 is a section through the end disk. Figure 17 is a sectional view taken along 17—17 of Figure 15.

Similar numerals refer to similar parts throughout the several views.

Proposed rotor plants rely on their weight to prevent their being turned over by the relative wind. Since the addition of weight increases the rolling friction of the car there is a very definite economical height for the rotors. This is a disadvantage since the maximum power output of a plant is proportional to the product of the height and the length of the track. The diameter or breadth of the plant is restricted by the area of the land available, but the height is not restricted except by the type of design. A wing is defined as a body elongated in the direction of the wind and capable of producing a lift or cross-wind force.

It is not contemplated to make any claims dealing with the mounting of a rotor on a car travelling over a double track with the object of generating electricity and placing reliance on the weight of the rotor and car to prevent overturning by the wind. Rather it will be shown that another system can be constructed five times as effective in extracting energy from the wind and of a design that will permit extremely high structures to be built, and consequently plants of several times the power output of a rotor plant for the same land area. Other advantages will appear from the development of the theory which is as follows:

In Figure 1a let the wing be moving along the path AA under the action of the wind velocity V. The velocity along the track is $v$. Then the resultant velocity is $V_R$ (also called the relative wind velocity). The wing experiences a lifting force L perpendicular to the wind, and a drag force D along the relative wind. The unbalance of force along the path times the path speed gives the power available from the wing. Let P be the power. Then $$P = (L \sin \phi - D \cos \phi) v$$
$$= \frac{\rho}{2} A V_R^2 (C_L \sin \phi - C_D \cos \phi) v \quad (1)$$

where A is the area of the wing and $C_L$ and $C_D$ are the well known coefficients of lift and drag. Since $$v = \frac{V}{\tan \phi} \quad (2)$$

and $$V_R = \frac{V}{\sin \phi} \quad (3)$$

$$P = \frac{C_L A V^3}{2} \left( \frac{1}{\tan \phi \sin \phi} - \frac{C_D}{C_L} \frac{1}{\tan^2 \phi \sin \phi} \right) \quad (4)$$

In general $\phi$ will be small enough so that $\tan \phi = \sin \phi$ very closely. Hence $$P = C_L \frac{\rho}{2} A V^3 \left( \frac{1}{\tan^2 \phi} - \frac{C_D}{C_L} \frac{1}{\tan^3 \phi} \right) \quad (5)$$

Differentiate Equation (5) with respect to $\phi$, and set it equal to zero to determine the value of $\phi$ for P to be a maximum. It is $$\tan \phi = \frac{3}{2} \frac{C_D}{C_L}$$

Hence $$P_{max} = \frac{2}{27} \left( \frac{C_L^3}{C_D^2} \right)_{max} \rho A V^3 \quad (6)$$

It is known in aerodynamics that the drag coefficient may be divided into a profile drag coefficient ($C_{DP}$) dependent on the air friction, and another drag coefficient due to the finiteness of the span (or tip loss). The latter is called the induced drag coefficient ($C_{Di}$). Then $$C_D = C_{DP} + C_{Di} \tag{7}$$

$$= C_{DP} + \frac{C_L^2 A}{\pi (kS)^2} = C_{DP} + \frac{C_L^2}{\pi R_a} \tag{8}$$

$$R_a = \frac{(kS)^2}{A} = \text{equivalent aspect ratio}$$

That is, the induced drag depends on the square of the lift coefficient and the plan form of the wing. The factor $k$ modifies the span S of the wing to account for variations of the plan form from an ellipse.

It may be found in the literature that $C_{DP}$ may be expressed as a function of the thickness of the wing expressed as a fraction of the chord. That is, $$C_{DP} = 0.0053 + 0.0317t \tag{8a}$$

This equation is for the wing alone but any power plant will have other frictional drags such as the housing for the generators if this is in addition to the wing as well as track rolling friction. For this reason it is desirable to add another term "$d$" to Equation 8a. The value of $d$ may be taken as 10% of the first two terms of the right-hand side of the Equation (8a). All claims involving $C_{DP}$ are to be interpreted for a latitude of $d$ in determining $C_{DP}$.

$$C_{DP} = 0.0053 + 0.0317t + d \tag{9}$$

By the calculus method of determining a maximum, it follows that $$\left(\frac{C_L^3}{C_D^2}\right)_{max} = \frac{(3\pi R_a)^{3/2}}{16\sqrt{C_{DP}}} \tag{10}$$

In like manner, for maximum power output $$\tan \phi = 6\sqrt{\frac{C_{DP}}{3\pi R_a}} \tag{11}$$

$$C_L = \sqrt{3\pi R_a C_{DP}} \tag{12}$$

Hence by substituting the value of $$\left(\frac{C_L^3}{C_D^2}\right)_{max}$$

in Equation (6)

$$P_{max} = \frac{\sqrt{3\pi}}{18} \sqrt{\frac{R_a}{C_{DP}}} \frac{\rho \pi (kS)^2}{4} V^3 \tag{13}$$

This is the maximum power output for one wing always entering undisturbed air moving with the velocity V relative to the earth. This equation has a geometrical interpretation. In Figure 1b construct the circle of diameter equal to the span. The volume of air passing through this circle is equivalent to the volume from which the wing extracts the energy.

As a matter of fact, the air is disturbed, by the wing, at great distance from the wing, but all these effects may be accounted for by assuming a uniform retardation of the flow through the area $$\frac{\pi S^2}{4}.$$

This area is called the sweep of the wing. If the wing has end disks or is not elliptic in plan form, the factor $k$ changes the area somewhat. In the case of rectangular wings $k$ is so near unity that it may be so taken.

If there are a great many wings it may be shown that the sweep of the individual wings is modified so that the sweep of the multiplane system becomes very closely the area of the gaps between the wings plus the half-circles at the ends provided the wings are close together. (See Figure 1c.)

In actuality the sweep for wings of elliptic plan form is given by the Figure 1f which may be considered as the sweep for the upper halves of a system of wings of elliptic plan form extending to the right and left.

Equation (13) may be modified for a great number of wings. It may be shown that in this case the equivalent aspect ratio is $$R_a = \frac{k_n^2 S^2}{nA} \tag{14}$$

where $n$ is the number of wings of area A.

Also the factor $k_n$, the equivalent monoplane span factor for a multiplane system is the square root of the ratio of the sweep of the system to the sweep of a simple monoplane wing. Thus if G is the gap between wings measured normal to the relative wind, $$k_n^2 = \frac{nGS}{\pi S^2/4} = \frac{4nG}{\pi S} \tag{15}$$

very closely if the set of $n$ wings are a group forming a closed system. Such a closed system would be formed by the wings following a circular path.

This equation for $k$ is also sufficiently accurate if the circular areas at the ends of the system may be neglected in comparison to the area between the wings. Such is the case here where the circuit is always closed.

The maximum power that can be extracted from the wind by $n$ wings is then $$P_{max} = \frac{\sqrt{3\pi^3}}{72} \cdot \frac{(k_n S)^3}{\sqrt{C_{DP} nA}} \rho V^3 \tag{16}$$

Also the equivalent area or sweep through which the relative wind passes is the product of the height S and the projection of B on a line normal to the relative wind. Thus the sweep = BS sin $\Phi$. From the geometry of Figure 1d $$BS \sin \phi = nGS \tag{17}$$

Also from the geometry of Figure 1d, and the definition of the factor $k_n$ $$k_n^2 = \frac{4}{\pi} \frac{B}{S} \sin \phi \tag{18}$$

Equations (17) and (18) lead back to $$k_n^2 = \frac{4nG}{\pi S} \tag{19}$$

Using Equation (19) in conjunction with Equation (16) the latter becomes $$P_{max} = \frac{\sqrt{3}}{9} \frac{S^3}{\sqrt{C_{DP} A}} \left(\frac{G}{S}\right)^{3/2} n\rho V^3 \tag{20}$$

A rotor has a profile drag coefficient of about 0.25 while a wing may have a value of 0.01. Since the power is inversely proportional to $$\sqrt{C_{DP}}$$

the wing system can produce $$\sqrt{25} = 5$$

times as much power as a rotor system.

If the wings travel on a closed circuit, the windward arc may be thought of as projected on the diameter lying at right angles to the wind, and the equations for P relate to this projection considered as a straight path. If the leeward arc is well downwind from the windward, the power output on this arc may be taken equal to the windward arc. The total power output is then twice that of Equation (20). On the other hand the angle $\phi$ must be measured between the tangent to the true path and the wind direction.

If we determine by the calculus the value of $C_L$ which makes $C_L^3/C_D^2$ a maximum, the value of $C_L$ for maximum power is found. The lift coefficient is for this condition $$C_L = \sqrt{3\pi R_a C_{DP}} \qquad (21)$$

It is desirable to relate the lift coefficient to the angle of attack of the wing. It is best to measure the angle from a line in the wing such that when the relative wind blows along this line the lift is zero. This zero lift line may be found as in Figure 1e. Through the trailing edge and the mid point of the mean camber line c1 draw the straight line marked $L=0$. The angle between the zero lift line and the wind direction is the angle of attack.

Also $$\alpha = \frac{d\alpha}{dC_L} C_L \qquad (22)$$

That is, $\alpha$ equals the slope of the $\alpha - C_L$ curve times $C_L$.

From aerodynamic theory $$\frac{d\alpha}{dC_L} = \frac{\pi R_a + 5.35}{5.35 \pi R_a} \qquad (23)$$

Hence $$\alpha = \frac{\pi R_a + 5.35}{5.35 \pi R_a} \sqrt{3\pi R_a C_{DP}} \qquad (24)$$

The relative wind makes the angle $\phi$ with the track and the wing makes the angle $\alpha$ with the relative wind. Hence the angle between the zero lift line and the track is (see Fig. 1g)

$$\begin{aligned} \theta &= \Phi - \alpha \\ &= \tan^{-1} 6\sqrt{\frac{C_{DP}}{3\pi R_a}} - \alpha \\ &\simeq \frac{V}{v} - \frac{\pi R_a + 5.35}{5.35 \pi R_a}\sqrt{3\pi R_a C_{DP}} \end{aligned} \qquad (25)$$

The value of $C_{DP}$ is defined by Equation (8a).

The value $\theta$ defines the best angle for the wings relative to the track for each wind condition.

In any case of maximum power the track speed is $$v = \frac{V}{6\sqrt{\dfrac{C_{DP}}{3\pi R_a}}} \qquad (26)$$

To recapitulate the maximum power for a multiplicity of wings is obtained when the path speed is $$v = \frac{V}{\tan \phi} \qquad (27)$$

$$\tan \phi = 6\sqrt{\frac{C_{DP} nA}{3\pi k_n^2 S^2}} = 6\sqrt{\frac{C_{DP}}{3\pi R_a}} \qquad (28)$$

$$k_n = \sqrt[3]{\frac{24 B^2}{\pi S}\sqrt{\frac{C_{DP} nA}{3\pi S^2}}} \qquad (29)$$

$$C_{DP} = 0.0053 + 0.0317 t + d \qquad (30)$$

$$\theta = \tan^{-1} 6\sqrt{\frac{C_{DP}}{3\pi R_a}} - \frac{\pi R_a + 5.35}{5.35 \pi R_a}\sqrt{3\pi R_a C_{DP}} \qquad (31)$$

The maximum power is then very closely, for both sides of the circuit $$P_{max} = 2n\frac{\sqrt{3}}{9}\frac{S^3}{\sqrt{C_{DP} A}} (G/S)^{3/2} \rho V^3 \qquad (32)$$

The above equations define the conditions for maximum power.

When the number of wings is specified $k_n^3$ is immediately determined and hence the track speed, assuming that the wing section and plan form have been also chosen. Hence a plant of $n$ wings per one side of the diameter taken normal to the relative wind, operates at maximum power with only one speed to wind ratio. Any other speed ratio gives less power. Also, any other angle of attack will give less power.

Since the ratio of track speed to wind speed is the tangent of $\phi$, the variation of power output or the variation of the wind-track speed ratio is statable in terms of $\phi$. To set the limits of $\Phi$ from which the claims limits for $\theta$ may be stated return to the general Equation 5 for the power output under any conditions.

In Equation (5), $$\frac{C_D}{C_L} \cdot \frac{1}{\tan^3 \phi}$$

is a small number since $$\frac{C_D}{C_L}$$

is small. Thus as a first approximation the power is inversely proportional to the square of the tangent of $\phi$. As a matter of fact, however, P will decrease less rapidly than $1/\tan^2\phi$ because of the last term. This Equation (5) determines the upper value or range of $\Phi$ for the claims. The following table shows how P varies with $\phi$ if everything else is kept constant.

Table I

| 1 | 2 | 3 | 4 | 5 | 6 | 7 | 8 | 9 |
|---|---|---|---|---|---|---|---|---|
| $\phi$ | $\tan \phi$ | $\dfrac{1}{\tan^2\phi}$ | % of P=100 | % of P=100 | % of P=100 | % of P=100 | % of P=100 | % of P=100 |
| 4° | .0699 | 204.5 | 100% | | | | | |
| 6° | .1051 | 95.0 | 46.4 | 100% | | | | |
| 8° | .1405 | 50.6 | 24.7 | 53.2 | 100% | | | |
| 10° | .1584 | 39.8 | 19.4 | 41.9 | 78.7 | 100% | | |
| 12° | .212 | 22.2 | 10.83 | 23.4 | 43.9 | 55.8 | 100% | |
| 14° | .249 | 16.1 | 7.87 | 16.95 | 31.8 | 40.4 | 72.5 | |
| 16° | .286 | 12.2 | 5.90 | 12.85 | 24.1 | 30.6 | 55.0 | 100 |
| 20° | .364 | 7.55 | 3.69 | 7.95 | 14.9 | 18.9 | 34.0 | |

It will be noted from Table I that the power output is sensitive to the angle $\phi$. For instance, if the structure of the plant specifies 6° as the most efficient angle (P=100%) a change of angle to 8°, maintaining everything else constant including the track speed, the power output falls to 53.2% as indicated in column 5.

If the most efficient angle were 8° a change to 12° would drop the power to 43.9% as shown in column 6. A 50% increase in the angle for maximum power will cause about a 50% drop in the power output.

The most economical angles are the relatively small angles for it must be remembered that power is force times velocity. If a low track velocity is used a great many wing units must be used to obtain a given power. It is therefore best to use as few wing units as possible. The permissible maximum track speed sets the lower limit to the number of wing units. For this reason it is not likely that $\tan \phi$ will be much less than 0.166 for which $\phi$ is 9°–30'. The preferred gap is then of the order of the height of the wing, but this is not to be regarded as a limiting dimension. Furthermore, improvements in present day track cars may make practicable much smaller values of $\Phi$.

It has been shown that the maximum power is proportional to $C_L^3/C_D^2$ and that here $$C_L = \sqrt{3\pi R_a C_{DP}}$$

Corresponding to this value of $C_L$ for maximum power is the angle of attack, $\alpha_{max}$. Table II below shows for a monoplane how the value of $C_L^3/C_D^2$ varies with $\alpha$ measured from the zero lift line. The wing section is National Advisory Committee for Aeronautics M—6 with a trailing edge flap at 10 degrees. It will be observed that a 50% variation in $\alpha$ to either side of $\alpha_{max}$ decreases the factor $C_L^3/C_D^2$ by about 30%.

$R_a = 10$

Table II

| | $\alpha$ | $C_L$ | $C_L/C_D$ | $C_L^3/C_D^2$ |
|---|---|---|---|---|
| | 0 | 0 | 0 | 0 |
| | 2 | .15 | 12.5 | 23.5 |
| | 4 | .30 | 23.06 | 160 |
| | 6 | .43 | 26.85 | 311 |
| | 8 | .59 | 28.10 | 468 |
| | 10 | .71 | 27.3 | 530 |
| | 12 | .86 | 25.3 | 553 |
| $\alpha_{max}$ | 14 | .99 | 24.1 | 576 |
| | 16 | 1.1 | 20.0 | 441 |
| | 18 | 1.22 | 17.95 | 394 |
| | 20 | 1.35 | 16.45 | 366 |
| | 22 | 1.46 | 15.05 | 332 |

The mechanical and structural features by which I carry the theory into practice will be clear from the drawings and the following description—

In Figures 2, 3 and 4 the wings 1 are mounted on wheels 2 and travel on the track 3. The wings are interconnected by the cables 4 and 5. In the lower section of a wing is mounted an electric generator 7 (see Figure 6) which is geared to the axle of the wheels. The wind propels the wings along the track and as a result electric energy is generated.

The wings are supported, against overturning, by the structural framework 8. These frames are placed at intervals about the track and carry a continuous track 9 shown as a solid I-section in the Figure 4. In actual practice this frame may be built up of lattice structure for lightness.

The structure connecting the wings to the upright frames is shown best in Figures 4 and 5. A connecting rod 10 carries the rollers 11 and 12 at its forked end. Only one set of rollers bear on the I beam at any instant. The connecting rod has a vertical hinge connection 13 at the wing end, permitting the wing to pivot when desired. The connecting rod is sloped upward so that the frame 8 need not be tall.

The generator 7 is geared to the axles 17 of the cars by the gears 18, 19, 20, 21, 22, and 23a. (See Figures 6 and 7.)

It is sometimes undesirable to run the generator at speeds varying with the wind velocity, yet it is desirable to extract the maximum amount of energy from the wind. If the ratio of angular velocities of the wheel axle and generator shaft can be varied the generator speed may be constant while the wings always work at maximum power output. A change in angular velocity may be provided by friction drivers or by conventional gears. In Figure 7 the gears 20 and 21 rotate the shaft 21a which carries the gear 23 meshing with the gear 23a on the generator shaft. If a different speed is desired the gear 23a is disengaged from 23 and 22a is engaged with 22. Any number of combinations may be added.

Due to the upward inclination of the supporting rod 10 there will be a tendency to lift the wing from its track when the wing is on one side of the track circuit. (See Figure 4.) On the opposite side the tendency is to increase the pressure of the wheels on the track.

Figure 6 shows the method used to maintain good bearing of the wheels on the track under all conditions. The frame 24 of the wing carries two forked frames 25 and 26 which in turn provide bearings for the wheel axles 27 and 28. Between the end bearings of the parts 25 and 26 two links 29 and 30 extend downward to carry the wheels 31 and 32. These are also interconnected by the link 33. If the wing tends to rise from the track it is obvious that the wheels 2 are pressed more tightly against the track, and there is therefore no loss, through slippage, of driving action for the generator.

Provisions are also made to turn the wing through various angles as the wing progresses along the track so that at all times the wing gives its best effect. Along the portion of the track more or less normal to the wind direction the angles $\theta$ and $\phi$ should have values defined by Equations (28) and (31) respectively.

The angular attitude of the wing toward the track must be varied to obtain the maximum power. The rotation of the wing takes place about the vertical shaft 34a which is rigidly attached to the wing framework 34. The shaft extends downward into the generator compartment 35 which does not change its attitude with respect to the track. The disk 36 is rigidly attached to the lower compartment. Antifriction bearings at 37 and 37a facilitate the rotation of the wing which is accomplished by the motor 38 through the worm 39 and gear 40.

Figure 8:
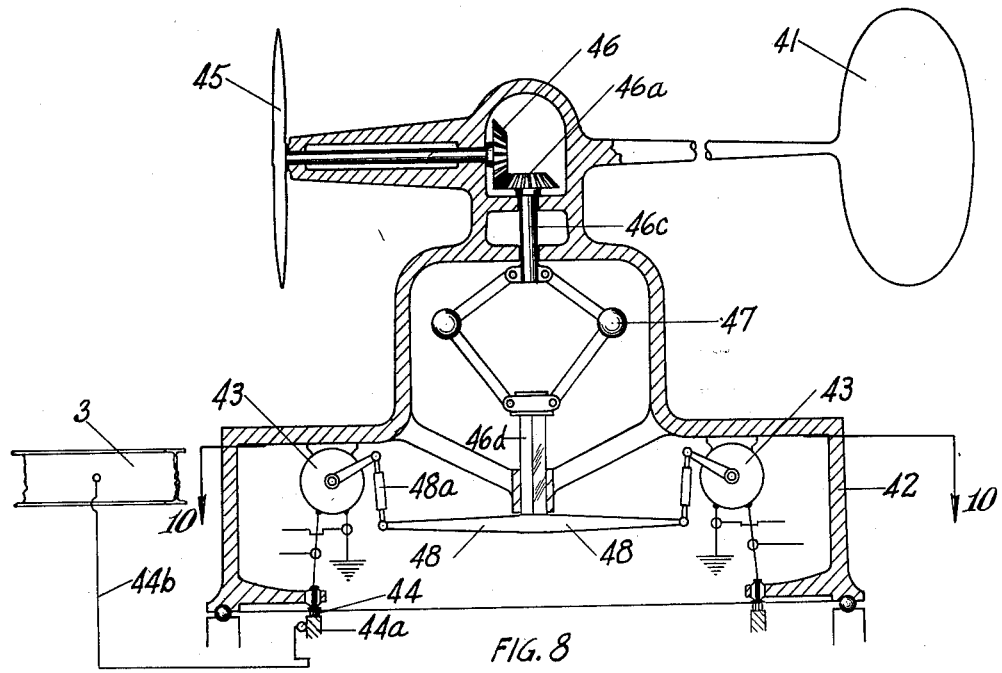
Figure 9:
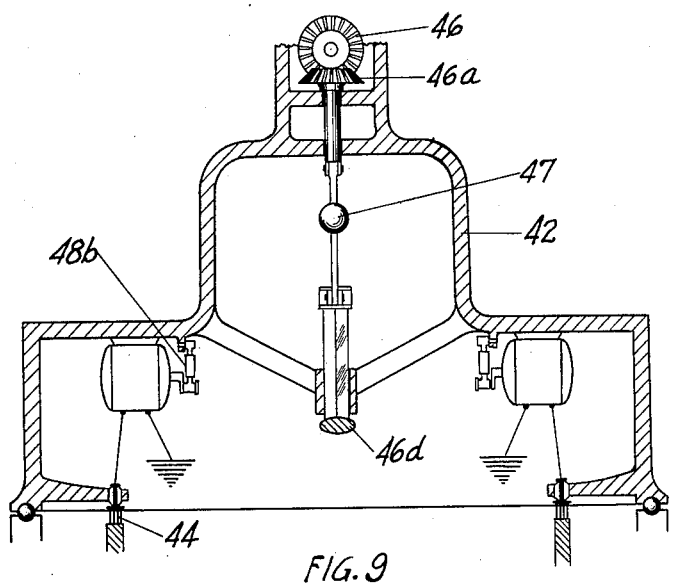
Figure 10:
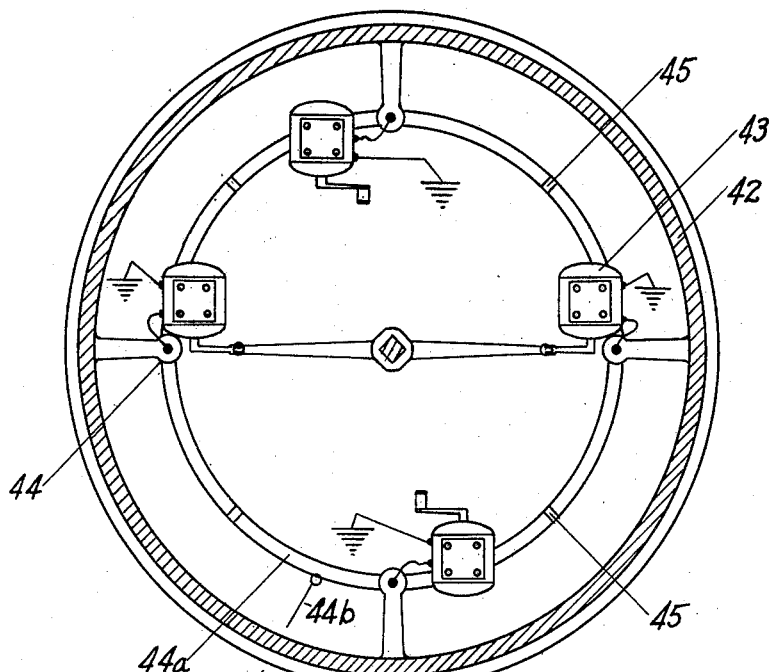
Figure 11:
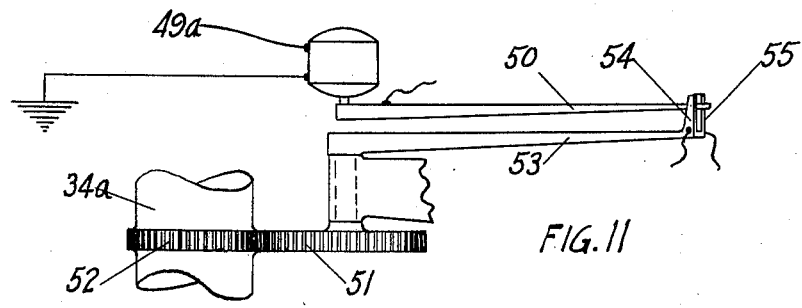

The angular attitude of the wings on various segments of the track may be made to depend on the wind direction and intensity. In Figure 8 the wind vane 41 is located far enough away from the wings to be undisturbed by them and so registers the true direction. The vane may also be located near the wings and a correction made for interference. The vane is rigidly connected to the housing 42 which is free to turn on ball bearings at its base. The housing supports a number of self-synchronous motors 43 sold in the case of the General Electric Company under the trade name of Selsyn motors. These motors have the property that if two of them are wired together in an A. C. circuit and the rotor of one is turned through a given angle, the rotor of the second will turn through a like angle. The Selsyn motors 43 (Figure 8) and 49 (Figure 6) are to bear such a relationship to each other. One wire of the motor 43 is grounded but the other runs to the contact brush 44 carried by the housing and making contact with the circular arc 44a. The arc 44a is insulated from the other arcs by the insulation at 45 in Figure 10. A conductor 44b runs from the arc to the segment of the track 3 where a brush 49b (see Fig. 6) conducts the current by means of conductor 49a to the Selsyn motor 49. Hence if the rotor of 43 be set at a certain angle the rotor of the motor 49 will take a like angle when the two motors are in circuit through the track and arc segments. Each segment of track is insulated from the other. Thus to each segment of arc 44a there corresponds a segment of track 3. On each segment of arc there is a Selsyn motor 43 with a certain rotor setting. On the corresponding segment of track the Selsyn motor 49 must take up the same rotor setting.

The variation in the attitude of the rotor of the motor 43 is regulated from a given initial setting by the magnitude of the wind velocity. The revolutions of the windmill 45 are determined by the wind speed. The windmill drives the gears 46 and 46a and shaft 46c which rotates the balls 47.

As the rate of rotatiton increases the balls fly outward and raise the square shaft 46d and arms 48. Connecting rods 48a connect the arms 48 with a crank on the motor shaft. The connecting rods have right and left-hand threads at their ends so that the armatures may be given a predetermined setting at any predetermined wind velocity. If the wind velocity is different from this value, the vertical position of the arms 48 will change. Only the motors lying on the windward and leeward sides are connected to the arm 48. The motors on the other two sides have the attitudes of their rotors fixed by a connecting rod 48b running to the housing. (See Fig. 9.) That is, on the sides of the track parallel to the wind, the wings take up either 0° or 90° attitudes with respect to the track, the 0° attitude being on the track side where the wings are advancing into the wind. These attitudes are maintained regardless of the wind velocity.

Each motor in the housing makes contact with a segment or arc of the circular conductor 44a. (See Figure 9.) Each arc is insulated from the neighboring one. As the wind changes in direction the housing is rotated. If the rotation is large enough one motor with a certain rotor setting passes off a segment of 44a and a new motor with a new setting comes on to the arc. The result is a change in the rotor setting in the wing Selsyn motor.

Let the circuit from one of the Selsyn motors 43 lead to the Selsyn motor 49 in the wing. (See Figures 6, 8, 10, 11, and 12.) The Selsyn motor shaft carries the arm 50. Just below is another arm 53 carried by the gear 51 which meshes with another gear 52 on the shaft 34a. The gears are of the same diameter so that the angular changes of shaft and arm 53 are alike. When the Selsyn motor moves the arm 50, this arm makes contact with one of two spring electrical contacts 54, and 55 carried on the lower arm 53. The electrical circuit for the motor 38 passes through the contact and arm 50. The wing is then rotated by the worm 39 and gear 40. If electrical contact had been made with the other contact, the motor 38 would have run in the opposite direction. Thus the angular attitude of the wing is controlled by the wind vane.

Since the wing takes up both plus and minus angles θ (see Fig. 1) with respect to the track it should have an airfoil section of zero mean camber. An investigation of wings possessing airfoil sections of zero camber shows that the specific value $C_L^3/C_D^2$ may be improved by hinging the aft portion of the wing and rotating it through an appreciable angle. For instance, a 10° flap angle greatly improves the specific value for the M—6 airfoil. Accordingly the wings (Figures 6, 13 and 14) have a hinged flap 56. As the angular attitude of the wing changes from plus to minus referred to the track, the flap angle likewise changes from plus to minus. This procedure keeps the convex side of the mean camber line always toward the direction of progression.

The change in flap position may be made to depend on the attitude of the wing. The flap 56 has the spar 57 within extending over the span. (See Figures 13 and 14.) Hinges 58 and a bracket 59 serve to support the flap on the main wing structural member 34a. The flap carries the horn 59. A link 60 connects the horn with a bell crank 61. Another arm of the bell crank is connected to the connecting rod 63. At the opposite end of this rod a universal joint 64 connects the rod to a threaded rod 65 which runs through the threaded hub of a worm wheel 66. The gear hub is carried in bearings 67 and 68 suitably supported by the wing structure. A worm 69 driven by the motor 70 may then move the connecting rod fore and aft. To this motion corresponds an angular movement of the flap. The connecting rod 63 carries an arm 71 which projects into a box 72 supported on the wing structure. This box contains a limit switch which shuts off the motor when the connecting rod has travelled a given distance in either direction. This distance will correspond to the angular position predetermined for the flap.

The reversal of the motor 70 is accomplished by the device shown in Figure 13. A passage 73 extends through the wing. Near the center of the passage is a ball 74 with a supporting rod 75 leading to the main wing structure where it is hinged at 76. The direction of the flow through the passage determines which way the flap will be moved. If the flow is up through the passage, as in Figure 13, the rod will make contact with the electrical contact 77 and result in the motor turning in such a direction that the trailing edge of the flap 56 comes down. When the flow through 73 reverses the motor will be reversed and the flap angle also.

The wings may carry end shields 79 at the wing tips, as in Figures 3, 15 and 16. This end shield will be most efficient in reducing the induced drag when the wing height to chord ratio (that is, the geometric aspect ratio) is small. In any case, an improvement is obtained if the boundary layer on the end shield is accelerated. The boundary layer consists of the air close to the surface which has been retarded by friction with the wing surface. The boundary layer may be accelerated by blowing out the slot 80. This is accomplished by the electric motor 81 and conventional fan 82. The exit 83 of the fan leads into the disk interior 84 and thence out the slot 80.

The interior of the shield is divided into two compartments 84 and 85 and the fan 82 draws its air from the rear compartment 85 through the opening 90 in the shield. In this case the boundary layer is drawn into the shield by the addition of kinetic energy and the operation serves to improve the effectiveness of the shield. This principle is well known in aerodynamics and the term boundary layer energization covers both blowing and suction means of controlling the boundary layer. Its application to an end shield is new.

The electric current from the generator 7 is delivered through the wires 87 and arm 88 to the brushes 89 and 90 thence to the trolley wires 91 and 92 from which it may be distributed for use.

Such a wind driven electric power plant as has been described may be termed an aero-electric power plant. The energy derived from the translation of the wings may also be used to perform other useful work besides the rotation of the generator shaft.

It should be understood that I do not limit myself to the disposition of wings shown in Figure 2. In particular, where I use a few wings so that the path speed is larger than the wind speed I orient both the advancing and retreating wings substantially along the path.

A body is called broad if it has a relatively large extension transverse to the direction of flow of fluid past it.

While the form of this apparatus herein described constitutes a preferred embodiment of the invention, it is to be understood that the invention is not limited to these exact forms or to a prime mover only since by simply reversing the process the fluid-rotor may receive power to motivate the fluid. That is, changes may be made without departing from the scope of the invention which is defined in the appended claims.

I claim:

1. A plurality of wings following each other substantially parallel to themselves about a closed path associated with a flow of fluid, an element rotated by the relative flow, a device sensitive to the flow direction, and means to coordinate the inertia force of the rotating element with the direction sensitive device to create automatically and surely a desired set of lifting conditions on the wings when they are at particular localities along their path said conditions having as one feature an increase of path speed with an increase in flow speed.

2. A plurality of wings travelling along a non-circular path associated with a flow of fluid, a device sensitive to the flow direction, a speed sensitive device, means to correlate the devices to maintain a given angular relation between the path and the wing along a major portion of the windward path.

3. A plurality of wings following each other substantially parallel to themselves about a closed path associated with a flow of fluid, an element rotated by the flow, and means to use the inertia force of the element to adjust the attitude and increase the path speed of the wings with an increase of flow speed.

4. A plurality of wings of airfoil section following each other substantially parallel to themselves in succession about a closed path associated with a flow of fluid; and a device sensitive to the intensity of the flow cooperating with direction sensitive means to alter the angle $\theta$ of a wing relative to the portion of the path substantially transverse to the flow according to the following equations when either or both terms of the equation for $\theta$ are varied by as much as either plus or minus fifty per cent:

$$v = \frac{V}{\tan \phi}$$

$$\tan \phi = 6\sqrt{\frac{C_{DP}nA}{3\pi k_n^2 S^2}} = 6\sqrt{\frac{C_{DP}}{3\pi R_a}}$$

$$k_n = \sqrt[3]{\frac{24B}{\pi S}\sqrt{\frac{C_{DP}nA}{3\pi S^2}}}$$

$$C_{DP} = 0.0053 + 0.0317t + d$$

$$\theta = \tan^{-1} 6\sqrt{\frac{C_{DP}}{3\pi R_a}} - \frac{\pi R_a + 5.35}{5.35 \pi R_a} \sqrt{3\pi R_a C_{DP}}$$

5. A plurality of wings travelling along a closed path associated with a flow of fluid, said wings travelling with a velocity at least equal to six times the wind velocity and with an angle to the path at least as small as nine and one-half degrees, a device sensitive to the flow direction cooperating with a speed sensitive device to maintain the angle between the wing and the path along a major portion of the path transverse to the direction of flow.

6. A plurality of wings travelling about a closed path associated with a flow of fluid, and a means to assign a desired angle to a wing automatically in accordance with the flow velocity and direction, said means being independent of the translation of the blades along the path.

7. A wind actuated prime mover comprising a path, a group of wings pivotally mounted on the path, a device sensitive to the wind direction and an airscrew cooperating to alter the angular attitude of the wings along a specified section of the path in accordance with the direction and intensity of the wind.

8. A wind actuated prime mover comprising a path, a group of wings pivotally mounted on the path, a device sensitive to the wind direction cooperating with a device sensitive to the wind velocity to give such a specific angular attitude of the wings to the path at specific path localities in accordance with the direction and intensity of the wind that the path speed increases when the wind speed increases.

9. A wind actuated prime mover comprising a plurality of wings constrained to travel substantially parallel to themselves along a path, a device sensitive to the wind direction, an element rotated by the wind; and means to coordinate through a Selsyn motor the speed sensitive device and the inertia force of the rotating element so as to control the angular attitude of a wing on a definite segment of the path in accordance with the wind velocity and direction.

10. In a wind actuated prime mover comprising a non-circular path, wings pivotally mounted on the path to travel along it, a device sensitive to the wind direction cooperating with a speed sensitive device to maintain a given angular relation between the path and the wing along the major portion of the windward path.

11. A wind actuated prime mover comprising a track associated with a flow of fluid, a group of wings pivotally mounted on the track, a speed sensitive device cooperating with a device sensitive to the wind direction to maintain over a major portion of the track transverse to the wind the angle $\theta$ at a value specified by the following equations when either or both terms of $\theta$ are varied by as much as either plus or minus fifty per cent:

$$v = \frac{V}{\tan \phi}$$

$$\tan \phi = 6\sqrt{\frac{C_{DP}nA}{3\pi k_n^2 S^2}} = 6\sqrt{\frac{C_{DP}}{3\pi R_a}}$$

$$k_n = \sqrt[3]{\frac{24B}{\pi S}\sqrt{\frac{C_{DP}nA}{3\pi S^2}}}$$

$$C_{DP} = 0.0053 + 0.0317t + d$$

$$\theta = \tan^{-1} 6\sqrt{\frac{C_{DP}}{3\pi R_a}} - \frac{\pi R_a + 5.35}{5.35 \pi R_a} \sqrt{3\pi R_a C_{DP}}$$

12. A plurality of wings rotatable about an axis and provided with hinged spanwise flaps, and means to move the flaps relative to the wing proper, said means functioning in accordance with the pressure on the forward portion of the wing.

13. A plurality of wings rotatable about an axis and provided with hinged trailing edge flaps, and means to move the flaps relative to the wing proper with power from the relative air flow, said means functioning automatically in accordance with the angular relation of the wings to the relative wind.

14. A plurality of wings rotatable about a parallel axis and provided with hinged trailing edge flaps, means to move the flaps relative to the wing proper with power derived from the relative air flow, said means functioning automatically in accordance with the angular relation of the wings to the relative wind.

15. In combination with a body associated with a flow of fluid and capable of experiencing a force transverse to the direction of flow, an end shield having an opening in its surface for boundary layer energization and means to cause a flow through the opening.

16. In combination with a broad body associated with a flow of fluid and capable of experiencing a reduction of pressure transverse to the direction of flow, an end shield having an opening in its surface for boundary layer energization and means to cause a flow through the opening.

17. A wind actuated prime mover comprising a track, a group of wings pivotally mounted on the track, and shields at the ends of the wings having openings in their surface and means to cause a flow therethrough.

18. A wind actuated prime mover comprising a track, a group of wings pivotally mounted on the track, and shields at the ends of the wings having openings in their surface for energization of the boundary layer and means to cause a flow therethrough dependent on the relative wind.

19. A wind actuated prime mover comprising a lower track, a group of wings pivotally mounted on the track and constrained to the track against upward thrusts, an upper track in part supported by the wings to take the side thrust of the wings, and means to use the wings to do useful work.

20. A wind actuated mover comprising a track, a group of wings pivotally mounted thereon and constrained thereto against upward thrusts, and an upper track in part supported by the wings to take the side thrust.

EDWARD A. STALKER.